(12) United States Patent
Duesterwald et al.

(10) Patent No.: US 11,146,471 B2
(45) Date of Patent: Oct. 12, 2021

(54) PROCESS-AWARE TRACE SYNTHESIS FOR TRAINING PROCESS LEARNING

(71) Applicant: International Business Machines Corporation, Armonk, NY (US)

(72) Inventors: Evelyn Duesterwald, Millwood, NY (US); Vatche Isahagian, Belmont, MA (US); Vinod Muthusamy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/804,694

(22) Filed: Feb. 28, 2020

(65) Prior Publication Data

US 2021/0273871 A1    Sep. 2, 2021

(51) Int. Cl.
*H04L 12/26*    (2006.01)
*G06N 20/00*    (2019.01)
*H04L 29/06*    (2006.01)

(52) U.S. Cl.
CPC .......... *H04L 43/10* (2013.01); *G06N 20/00* (2019.01); *H04L 43/028* (2013.01); *H04L 63/12* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 9,489,630 B2 | 11/2016 | Achin et al. | |
| 10,366,346 B2 | 7/2019 | Achin et al. | |
| 10,460,177 B2 | 10/2019 | Chan et al. | |
| 2007/0067351 A1* | 3/2007 | Singh | G06F 16/20 |
| 2012/0323827 A1* | 12/2012 | Lakshmanan | G06N 5/003 706/12 |
| 2019/0012605 A1 | 1/2019 | Rajagopal et al. | |
| 2020/0057708 A1* | 2/2020 | Joshi | G06F 11/3461 |

OTHER PUBLICATIONS

Mel, et al. "The NIST Definition of Cloud Computing". Recommendations of the National Institute of Standards and Technology. Nov. 16, 2015.
Francescomarion, Cd et al., "Predictive Process Monitoring Methods: Which One Suits Me Best?" Apr. 6, 2018.
Authors, et al. Disclosed Anonymously, IPCOM000252344D; "Determining Priority Value of Processes Based on Usage History", IP.com Electronic Publication Date: Jan. 5, 2018.

(Continued)

*Primary Examiner* — Scott B Christensen
(74) *Attorney, Agent, or Firm* — Peter Edwards, Esq.; McGinn I.P. Law Group, PLLC

(57) ABSTRACT

A process trace updating method, system, and computer program product include retrieving, by a computing device, one or more historical executions of a process, receiving, by the computing device, a proposed incremental change, with regard to the process, for a proposed process, updating, by the computing device, the historical execution to build a machine learning model, and generating, by the computing device, a decision and a prediction about execution of the proposed process based upon the machine-learning model.

19 Claims, 13 Drawing Sheets

(56) References Cited

OTHER PUBLICATIONS

Authors, et al. Disclosed Anonymously, IPCOM000252359D; "Identifying and Determining Trustworthiness of a Machine-Learned Model" IP.com Electronic Publication Date: Jan. 5, 2018.
Ross, C.; "Interactive Learning for Sequential Decisions and Predictions", The Robotics Institute Carnegie Mellon University Pittsburg, Pennsylvania 15213, Jun. 2013.
Zhang, Jm. Et Al.; "Machine Learning Testing: Survey, Landscapes and Horizons", Jun. 19, 2019.

* cited by examiner

100

PROCESS-AWARE TRACE SYNTHESIS FOR TRAINING PROCESS LEARNING

BACKGROUND

The present invention relates generally to a process trace updating method, and more particularly, but not by way of limitation, to a system, method, and computer program product for quickly adapting the machine-learning model to still use the same model in a context of a changed process without yet having any traces collected on the updated process.

Processes underpin a large number of enterprise operations including loan origination, invoice management, and insurance claims processing. There is an increased use of artificial intelligence to reduce the cost or provide customer experience. Machine-learning and Deep learning models are used to predict different aspects of the process such as time based prediction (e.g. completion time, remaining time, delay time, execution time, etc.), outcome predictions (cost, successful completion, etc.), and path prediction (next activity, full path, etc.). These Models are trained and validated using execution traces of the process.

Given a deployed process P1, which uses a trained machine-learning model M1 to predict an outcome (e.g. next activity). Model M1 is trained using a set of traces T1 that were obtained by monitoring the execution of the process P1.

However, due to performance reasons, regulations or policy changes across the enterprise company, there may be a need to modify and deploy a new version of the process (P2). These types of changes could be control flow changes e.g. addition, deletion, substitution, reordering of nodes (i.e., steps in the process), addition, deletion, and modification of decision points, data and resource changes.

The new version of the process is denoted as P2. The machine-learning model M1 may no longer be suitable to accurately predict an outcome (e.g., next activity) for P2. Thus, there is a need for a new machine-learning model M2. Unfortunately, traces generated by executing P2 are not yet available.

There is a need to train a new machine-learning model M2 as a predictor for process P2 without execution traces based on P2.

Conventional techniques are related to handling changes in processes and transfer learning is used to incrementally train new models leveraging knowledge gained in earlier training. Applying transfer learning also requires new traces as additional training examples.

Therefore, there is a need in the art to synthesize a suitable training set for training a new model M2 for these changes. The synthesized training set is composed of the subset of the old training set T1 that is still applicable to the new process model P2 plus a set of speculative traces that are generated to cover the changes in P2.

SUMMARY

Thereby, the inventors have identified a need in the art for a technique to update models based on new processes.

In an exemplary embodiment, the present invention provides a computer-implemented process trace updating method, the method including retrieving, by a computing device, historical executions of a process, receiving, by the computing device, a proposed incremental change, with regard to the process, for a proposed process, updating, by the computing device, the historical execution to build a machine learning model, and generating, by the computing device, a decision and a prediction about execution of the proposed process based upon the machine-learning model.

In another exemplary embodiment, the present invention provides a computer program product, the computer program product comprising a computer-readable storage medium having program instructions embodied therewith, the program instructions executable by a computer to cause the computer to perform: retrieving, by a computing device, a historical execution of a process, receiving, by the computing device, a proposed incremental change, with regard to the process, for a proposed process, updating, by the computing device, the historical execution to build a machine learning model, and generating, by the computing device, a decision and a prediction about execution of the proposed process based upon the machine-learning model.

In another exemplary embodiment, the present invention provides a process trace updating system, the system including a processor; and a memory, the memory storing instructions to cause the processor to perform: retrieving, by a computing device, a historical execution of a process, receiving, by the computing device, a proposed incremental change, with regard to the process, for a proposed process, updating, by the computing device, the historical execution to build a machine learning model, and generating, by the computing device, a decision and a prediction about execution of the proposed process based upon the machine-learning model.

Other details and embodiments of the invention are described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
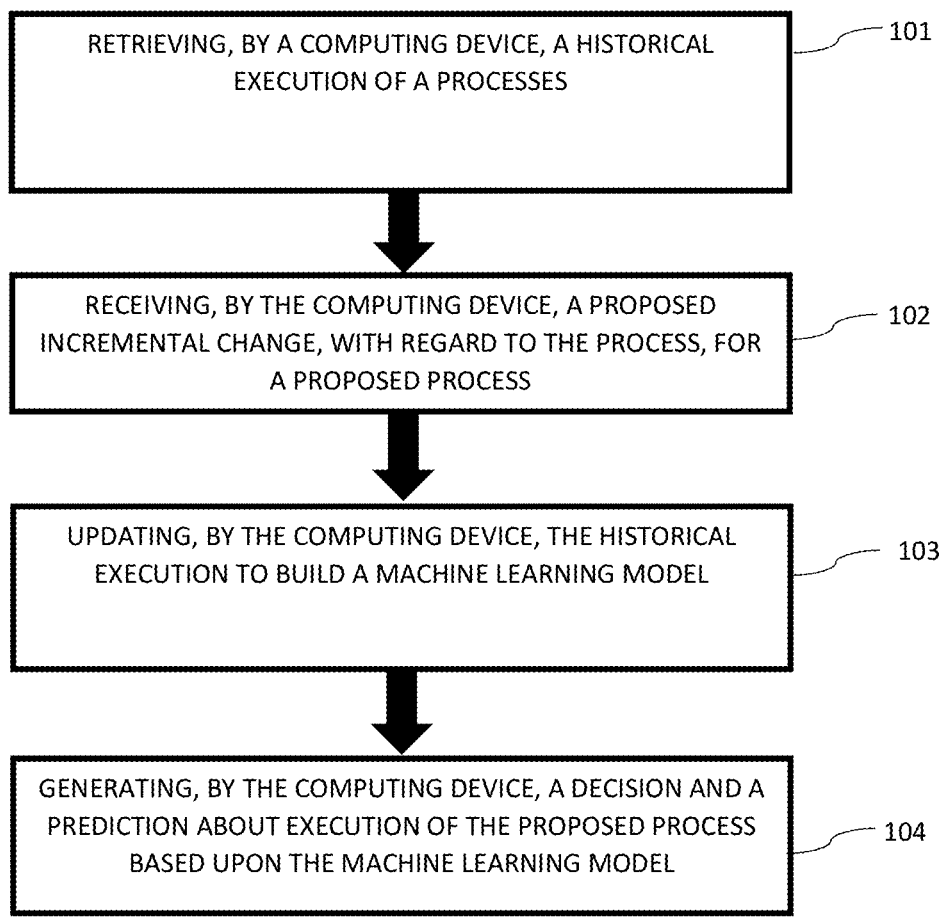
FIG. 1 exemplarily shows a high-level flow chart for a process trace updating method 100 according to an embodiment of the present invention.

The invention will now be described with reference to FIGS. 1-13, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a process trace updating method 100 according to the present invention can include various steps for adapting a machine-learning model trained on a set of process traces to changes in the underlying process.

Figure 11:
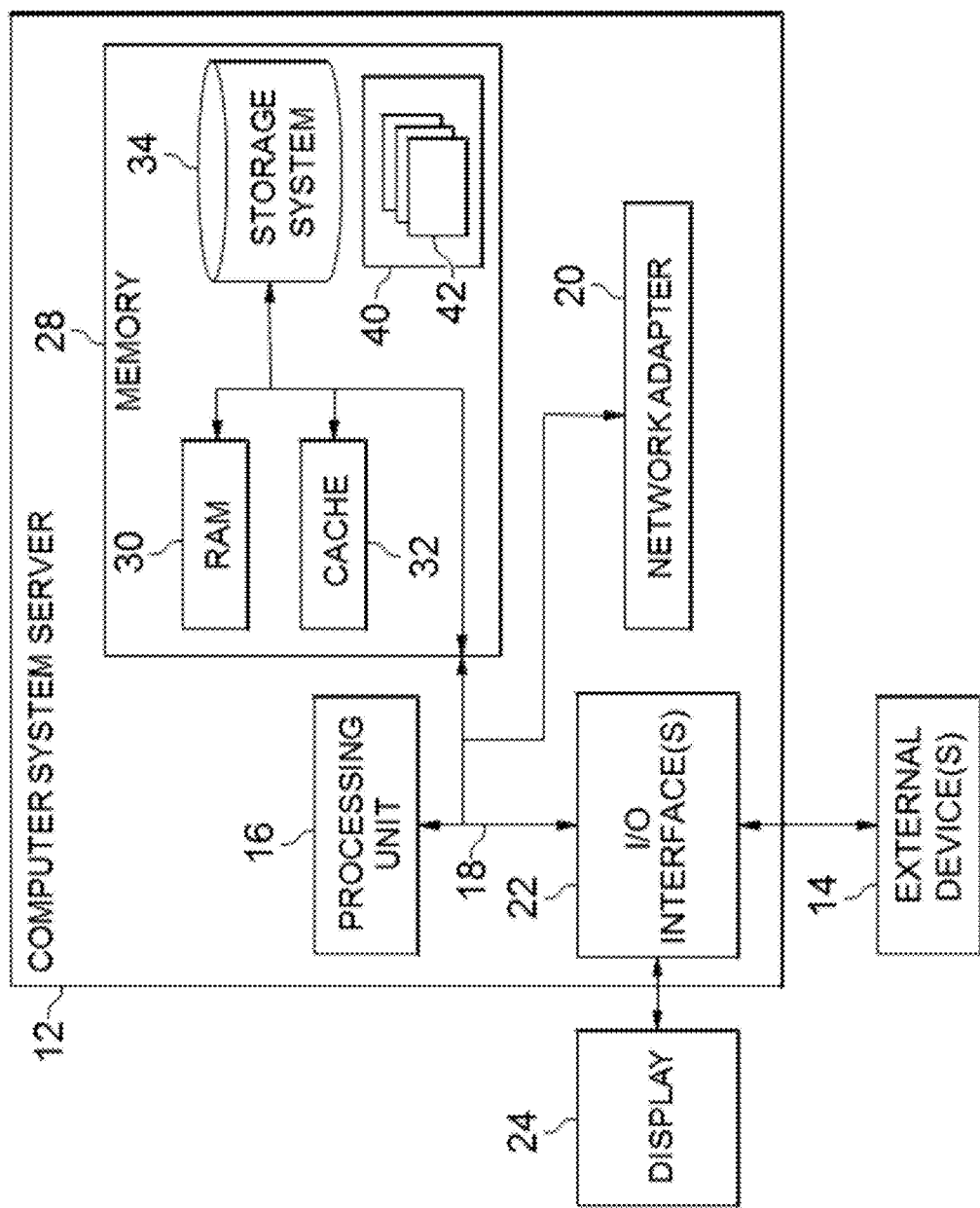
FIG. 11 depicts a cloud-computing node 10 according to an embodiment of the present invention.

By way of introduction of the example depicted in FIG. 11, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 13), it is nonetheless understood that the present invention can be implemented outside of the cloud environment.

With reference generally to FIGS. 1-10, in step 101 of FIG. 1, at least one historical execution of a process P1 is retrieved by a computing device. That is, in step 101, the invention retrieves a set of at least one historical executions of process. These historical executions can be represented as traces (T1). Also, optionally, in addition to retrieving the historical executions, the invention retrieves a decision model. M1 (i.e., a machine learning model) that was trained on the historical executions.

In step 102, a proposed incremental change, with regard to the process, for a proposed process P2 is received by the computing device.

In step 103, the invention updates the historical executions (represented as traces) to reflect the incremental change in the process and then updates the decision (machine learning) model from step 101 by utilizing the updated historical executions.

To update the historical executions, the invention first identifies a subset of valid traces from the historical executions. To do so, the invention marks all nodes and edges in a first process (P1) that are affected by the change in process, that is, nodes and edges that are not present in exactly the same way in a second process (P2). Then, the invention filters the traces from the historical executions (T1) to produce a second trace (T1') by eliminating all traces from T1 that include a node or an edge that was marked in P1.

Figure 10:
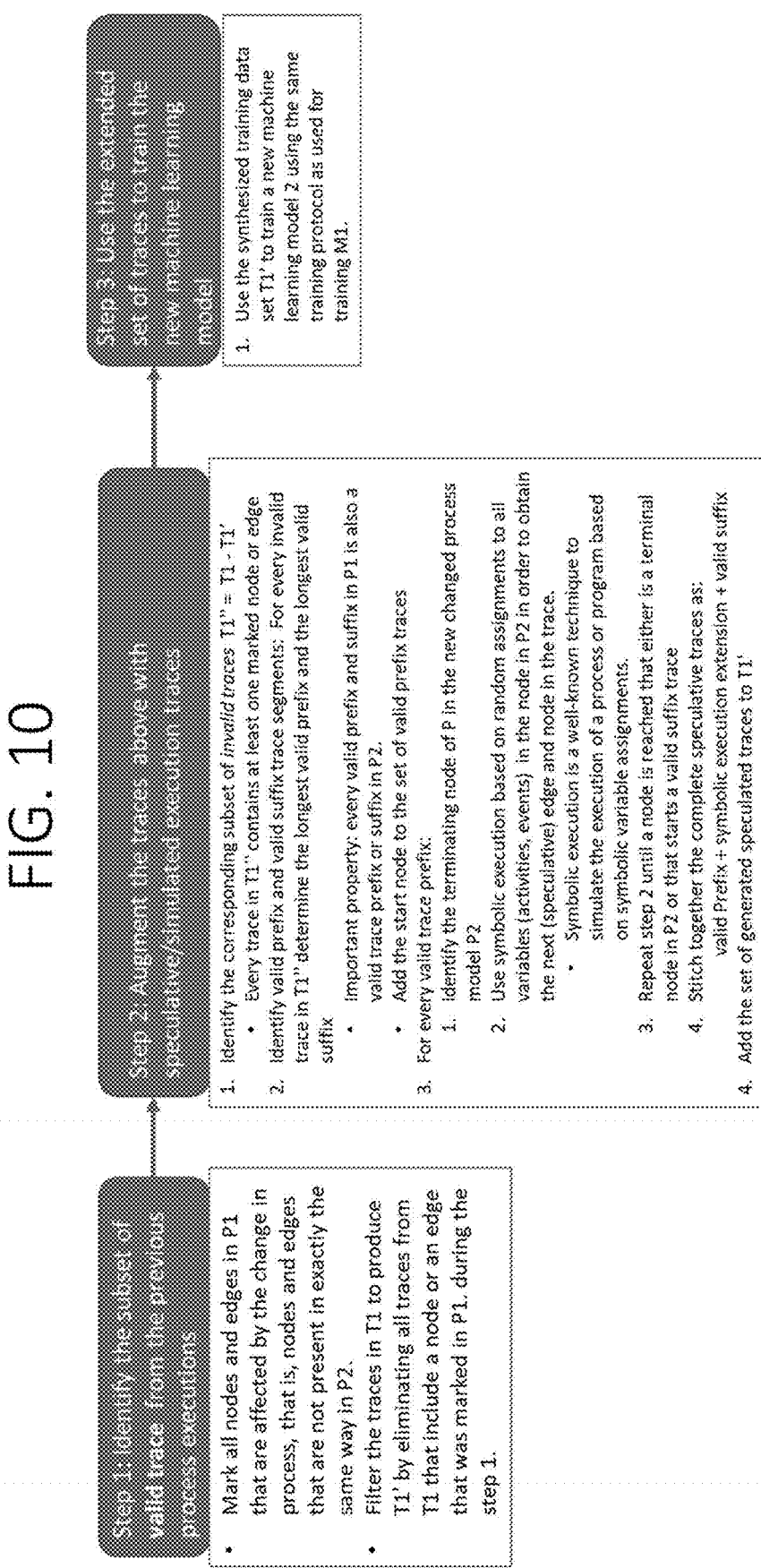
FIG. 10 exemplary depicts a detailed overview of each step in the method 100 according to an embodiment of the present invention.

As a next step, as more specifically shown in FIG. 10, the traces are augmented with speculative/simulated execution traces by identifying the corresponding subset of invalid traces (T1"=T1−T1') where every trace in T1" contains at least one marked node or edge. Then, the invention identifies valid prefix and valid suffix trace segments: For every invalid trace in T1", the invention determines the longest prefix and the longest suffix that are still valid trace prefix and suffix segments for an execution in the new changed process P2. (i.e., a prefix is valid in P2 if there exist a path in P2 from the start node that corresponds to the prefix).

Then, for every valid trace prefix:
1) Identify the terminating node of the prefix in the new changed process model P2
2) Use symbolic execution based on random assignments to all variables (activities, events) in the node in P2 in order to obtain the next (speculative) edge and node in the trace. It is noted that symbolic execution is a well-known technique to simulate the execution of a process or program based on symbolic variable assignments.
3) Repeat step 2 until a node is reached that either is a terminal node in P2 or that starts a valid suffix trace
4) Stitch together the complete speculative traces as: valid Prefix+symbolic execution extension+valid suffix Based on the above, the invention adds the set of generated speculated traces to T1'.

And, the invention then uses the synthesized training data set T1' to train a machine learning model M2, optionally re-using the same training protocol as used for an earlier trained model M1.

And, in step 104, a decision and a prediction about execution of the proposed process is generated by the computing device based upon the machine learning model.

Figure 4:
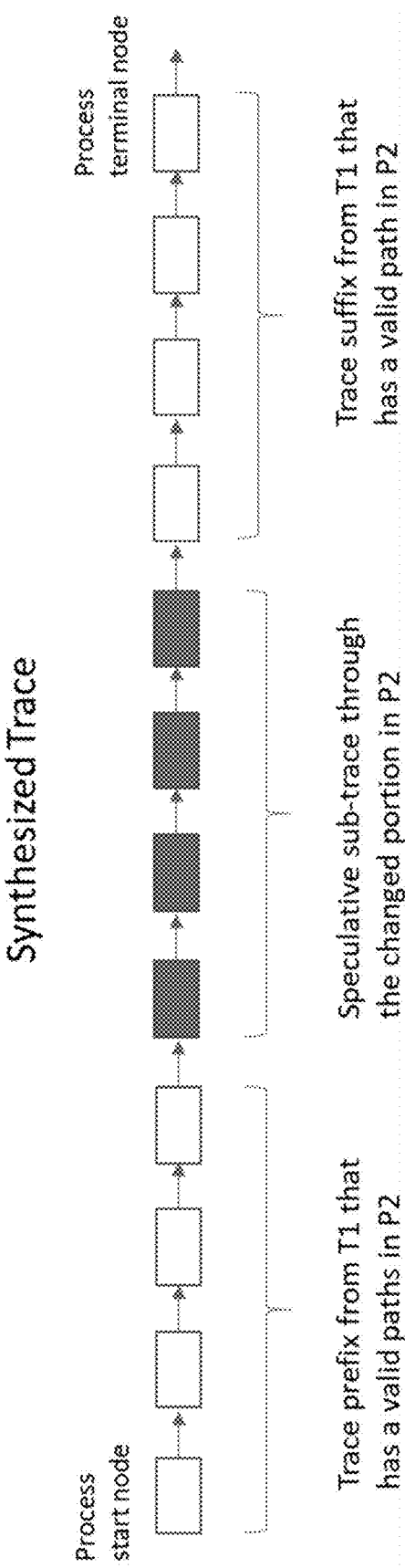
FIG. 4 exemplarily depicts a conceptual overview for the method 100 according to an embodiment of the present invention.

Thus, according to the method 100 and as shown in FIG. 4, when a business process changes (e.g., introducing a short cut in a loan application business process: "don't consider employment when determining a loan"), the invention can modify the process by finding a trace prefix from a first trace of the previous process and a trace suffix from the previous process that is still a valid path. Then, using the prefix and suffix of the still valid traces, the invention can speculatively sub-trace through the changed portion for the new process.

Figure 2:
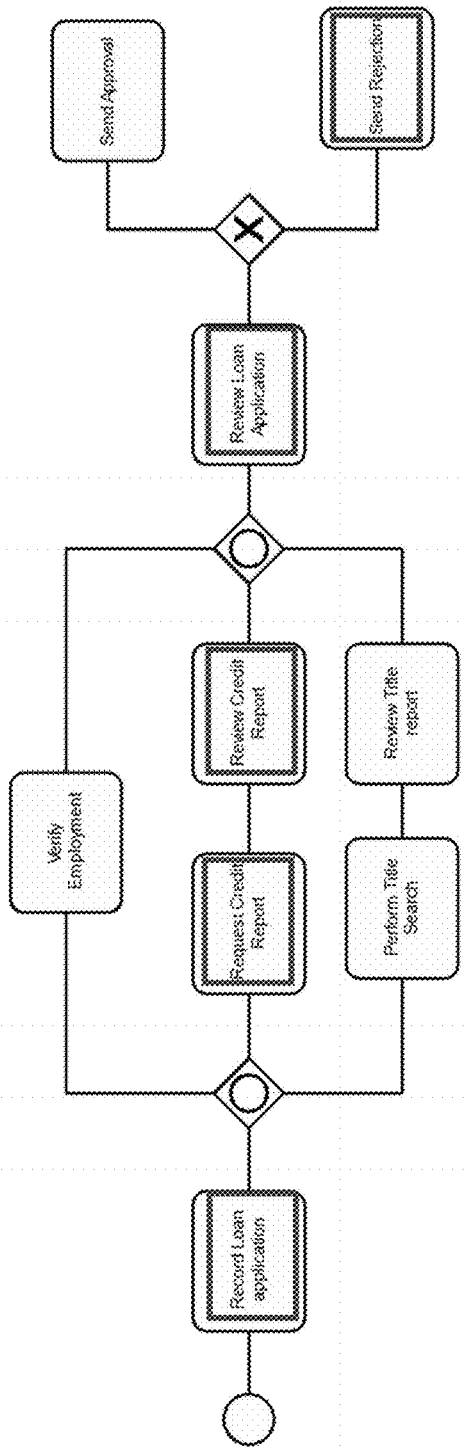
FIGS. 2-3 exemplarily depicts instances of business process can be presented as sequence of multi-dimensional activities for the method 100 according to an embodiment of the present invention.
Figure 3:
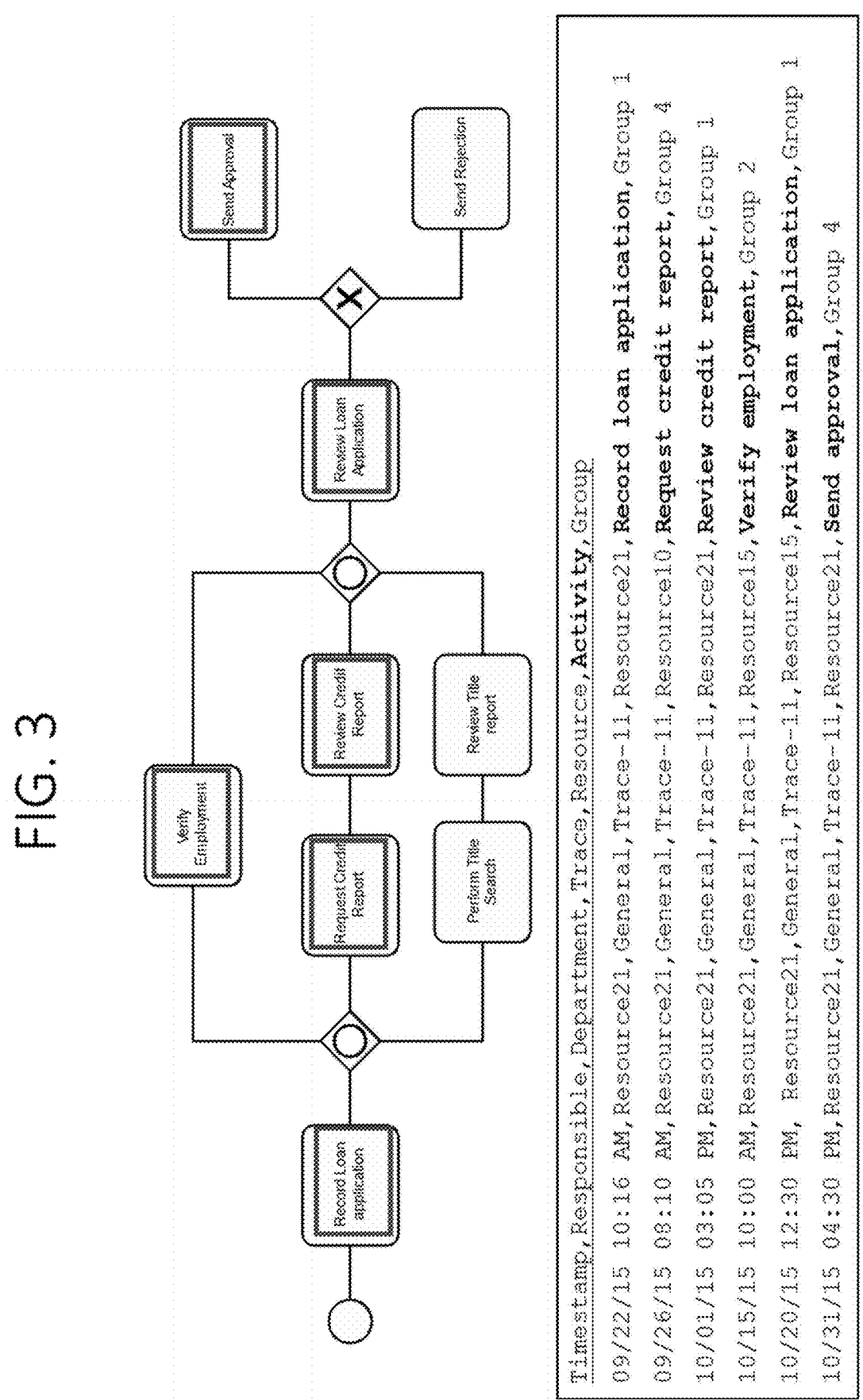

FIGS. 2-3 and 5-9 show exemplary business processes and changes that can be performed via the invention. For example, FIGS. 2-3 show instances of how the business process can be presented as sequence of multi-dimensional activities. The processes of FIGS. 2-3 depict a first process (P1) and the traces that are possible (i.e., V1 as version 1).

Figure 5:
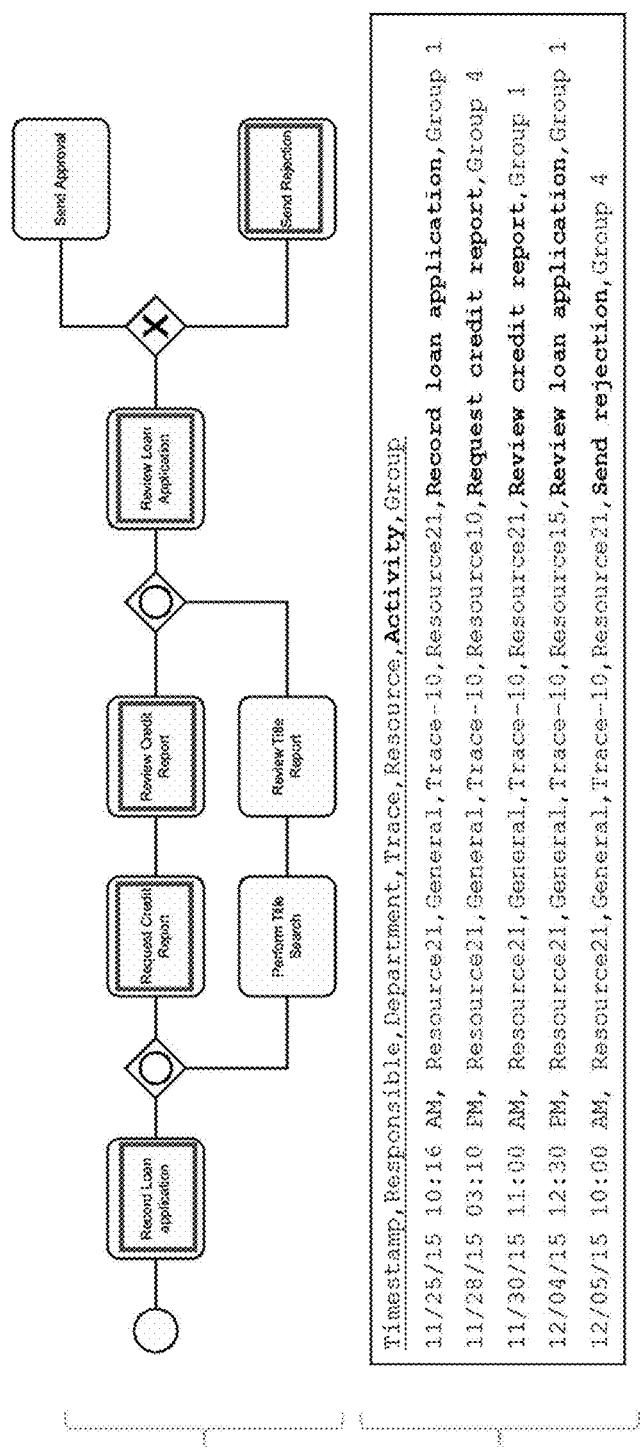
FIG. 5 exemplarily depicts an example of removing an activity in the modified business process according to an embodiment of the present invention.
Figure 6:
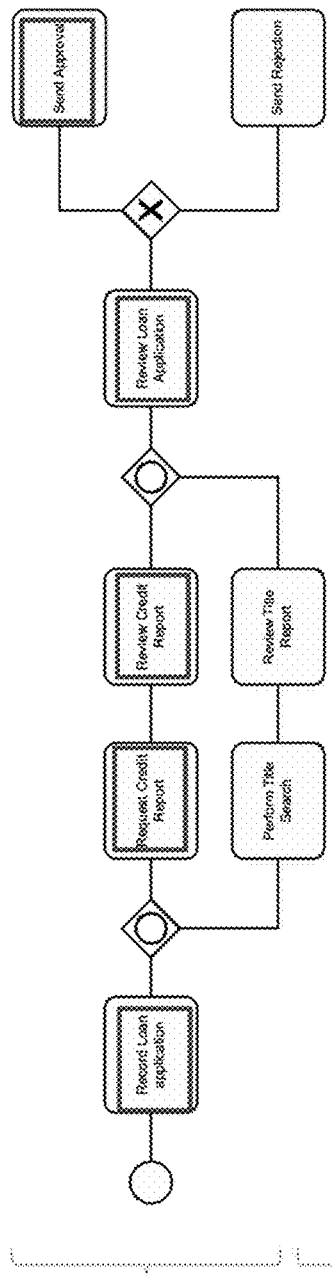
FIG. 6 exemplarily depicts a second example of removing an activity in the modified business process according to an embodiment of the present invention.

FIGS. 5-9 exemplary show changes in the traces based on a change in the business process for FIGS. 2-3. For example, as shown in FIG. 5, the business process of FIG. 2 is changed such that employment is no longer needed to be verified. However, the trace from FIG. 2 is still valid. However, as shown in FIG. 6, the trace is no longer valid with the change in business process from FIG. 3 because the business process no longer needs to verify employment. Therefore, the invention removes the part of the trace that is not valid.

Figure 7:
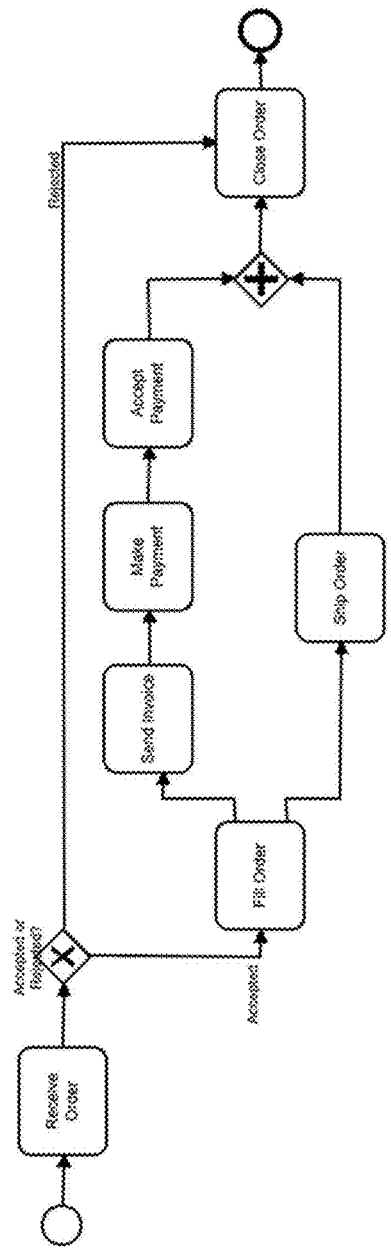
FIG. 7 exemplarily depicts an example business process (order processing) according to an embodiment of the present invention.
Figure 8:
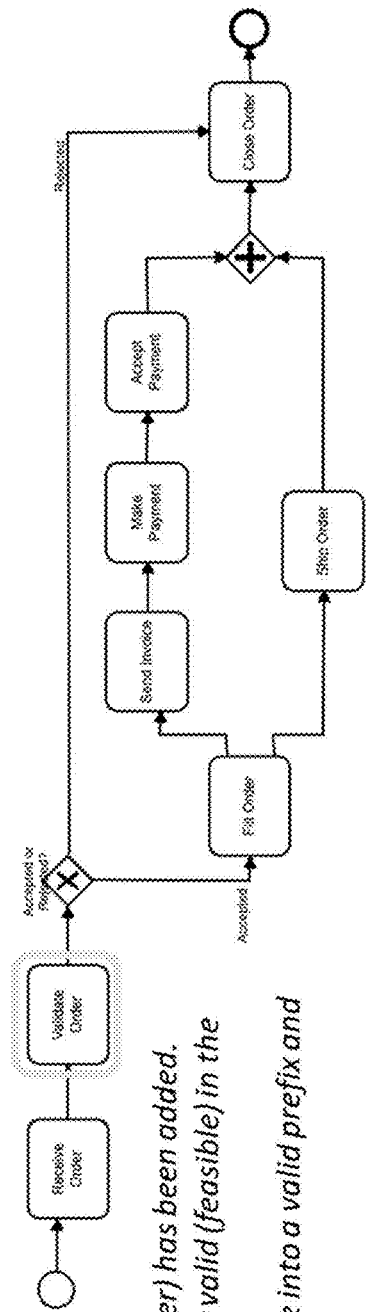
FIG. 8 exemplarily depicts an updated business process with additional activity according to an embodiment of the present invention.
Figure 9:
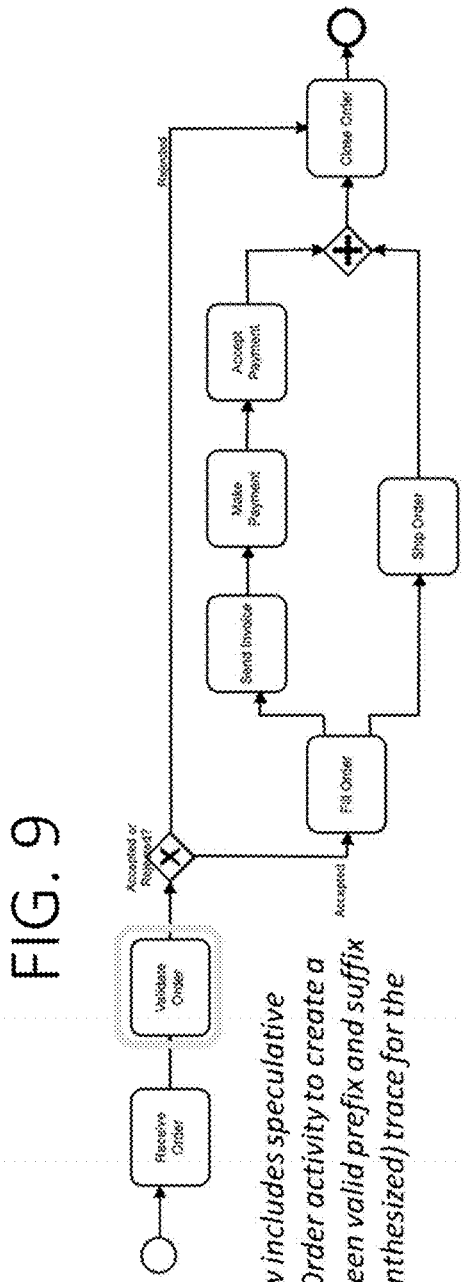
FIG. 9 exemplarily depicts an updated business process with additional activity according to an embodiment of the present invention.

FIG. 7 depicts order processing as a business process. FIG. 8 shows a change in the business process by adding a new activity (validate Order). The trace of FIG. 7 is no longer valid (feasible) in the new process. But, the invention can dissect the trace into a valid prefix and a valid suffix section. In order to synthesize a complete valid trace for the new process, the invention fills the hole between the valid prefix and the valid suffix. That is, as shown in FIG. 9, The synthesized trace includes speculative attributes for the 'Validate Order' activity to create a synthesized hole filler between valid prefix and suffix. The result is a complete (synthesized) trace for the new process).

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 11, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 12:
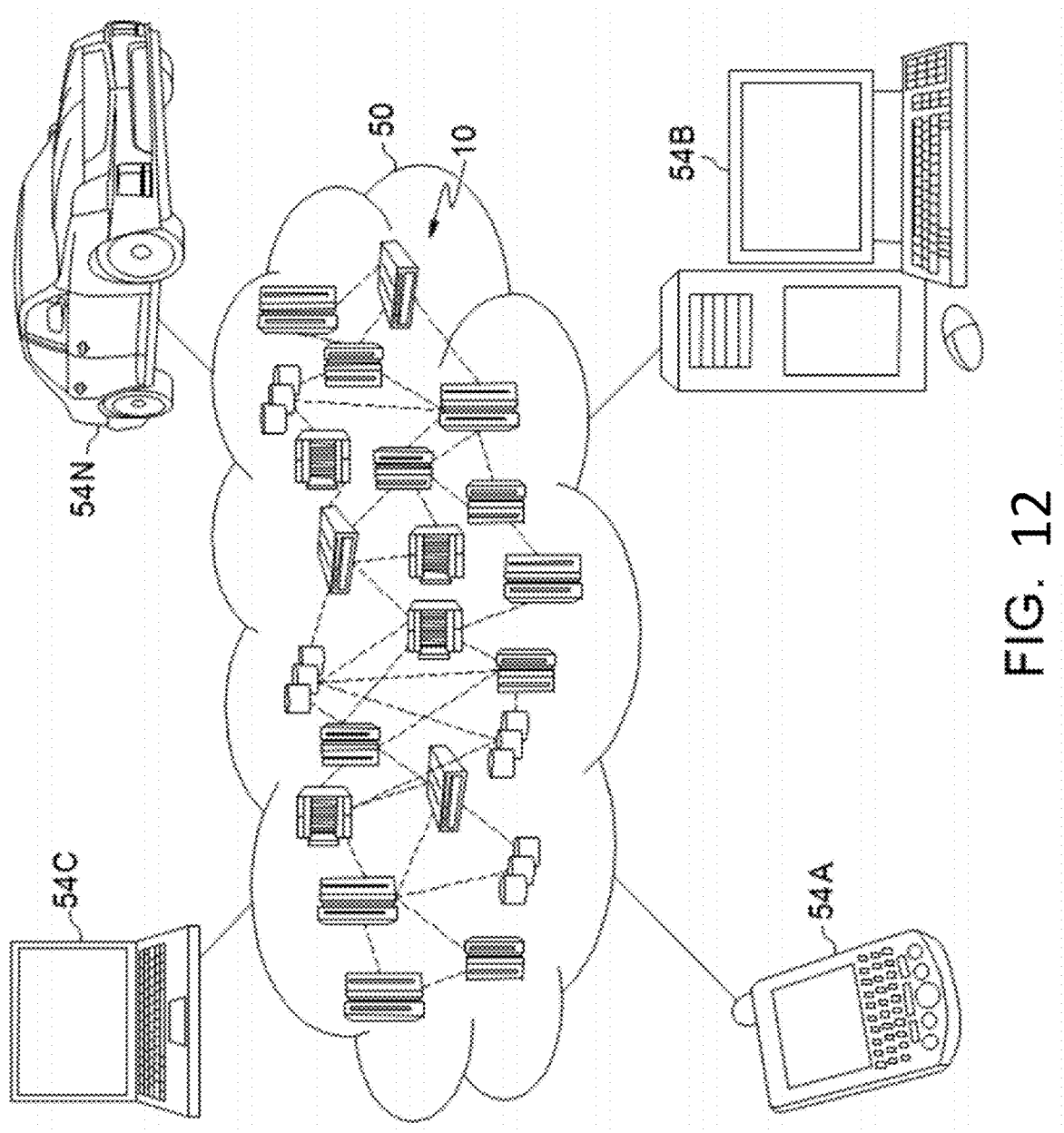
FIG. 12 depicts a cloud-computing environment 50 according to an embodiment of the present invention.

Referring now to FIG. 12, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 12 are intended to be illustrative only and that computing nodes 10 and cloud computing environment 50 can communicate with any type of computerized circuit over any type of network and/or network addressable connection (e.g., using a web browser).

Figure 13:
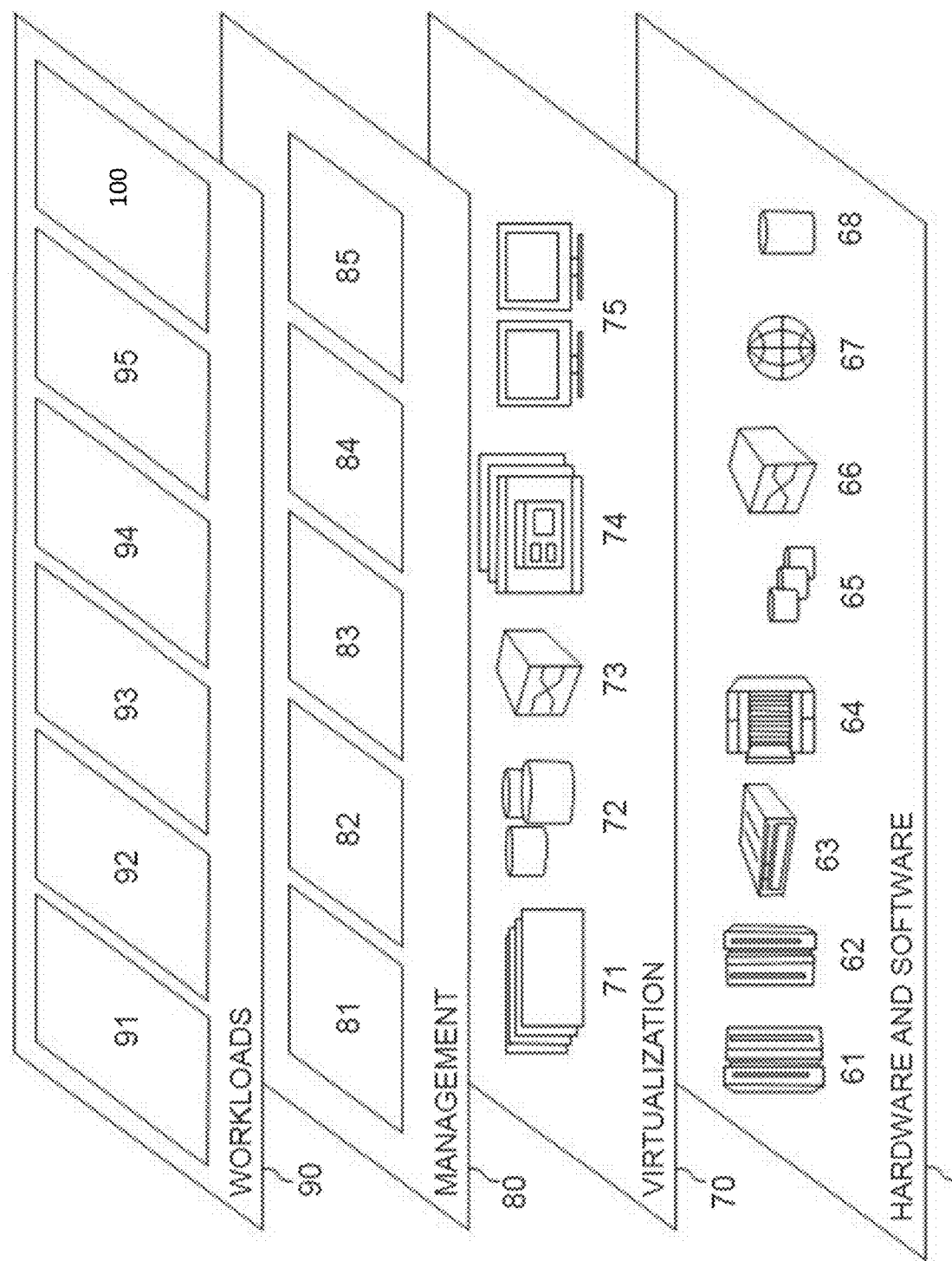
FIG. 13 depicts abstraction model layers according to an embodiment of the present invention.

Referring now to FIG. 13, an exemplary set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and process trace updating method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device recivies computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented process trace updating method, the method comprising:
    retrieving, by a computing device, a historical execution of a process that is represented as a trace of the process when changes to a decision problem has occurred that render available data of the trace as invalid;
    receiving, by the computing device, a proposed incremental change, with regard to the process, for a proposed process;
    updating, by the computing device, the historical execution to build a machine learning model that uses the proposed incremental change to generate a valid trace of the process by performing a trace starting at a beginning of a portion of the trace that is invalid; and
    generating, by the computing device, a decision and a prediction about execution of the proposed process based upon the machine-learning model and based on a simulated execution of a part of the proposed process.

2. The method of claim 1, wherein the machine-learning model extends the historical execution of the process to model the proposed process by:
    identifying a subset of valid traces from the historical execution of the process; and
    augmenting the valid traces.

3. The method of claim 2, wherein the augmented valid traces are used as training data to improve the machine-learning model.

4. The method of claim 2, wherein the identifying identifies the subset of valid traces by:
    marking all nodes and edges in the historical execution of the process that are affected by the proposed incremental change; and
    filtering the valid traces in the proposed process to produce a proposed trace by eliminating all traces from the valid traces that include a node or an edge that was marked in the historical execution of the process.

5. The method of claim 4, wherein the augmenting augments the valid traces by:
    identifying a corresponding subset of invalid traces;
    identifying for every subset of invalid traces the valid prefix trace segments and the valid suffix segments, and, determining a longest of the valid prefix trace segment; and
    setting the longest of the valid trace segment as a starting point for a new trace for the proposed process.

6. The method of claim 5, wherein for each starting point of a new trace for the proposed process is augmented by:
    speculatively adding reachable nodes in the proposed process to the segment until the entry node of a valid trace suffix is reached; and
    appending the reached valid trace suffix to the last speculatively added node to form a trace for the proposed process.

7. The method of claim 1, wherein the computer-implemented process trace updating method interacts with a cloud computing environment server, and
    wherein the computing device includes a cloud on-demand self-service that communicates with the cloud computing environment server.

8. The method of claim 1, embodied in a cloud-computing environment.

9. A computer program product, the computer program product comprising a computer-readable storage medium having program instructions embodied therewith, the program instructions executable by a computer to cause the computer to perform:
    retrieving, by a computing device, a historical execution of a process that is represented as a trace of the process when changes to a decision problem has occurred that render available data of the trace as invalid;
    receiving, by the computing device, a proposed incremental change, with regard to the process, for a proposed process;
    updating, by the computing device, the historical execution to build a machine learning model that uses the proposed incremental change to generate a valid trace of the process by performing a trace starting at a beginning of a portion of the trace that is invalid; and
    generating, by the computing device, a decision and a prediction about execution of the proposed process based upon the machine-learning model and based on a future execution of a part of the proposed process.

10. The computer program product of claim 9, wherein the machine-learning model extends the historical execution of the process to model the proposed process by:
    identifying a subset of valid traces from the historical execution of the process; and
    augmenting the valid traces.

11. The computer program product of claim 10, wherein the augmented valid traces are used as training data to improve the machine-learning model.

12. The computer program product of claim 10, wherein the identifying identifies the subset of valid traces by:
    marking all nodes and edges in the historical execution of the process that are affected by the proposed incremental change; and filtering the valid traces in the proposed process to produce a proposed trace by eliminating all traces from the valid traces that include a node or an edge that was marked in the historical execution of the process.

13. The computer program product of claim 12, wherein the augmenting augments the valid traces by:
identifying a corresponding subset of invalid traces;
identifying for every subset of invalid traces the valid prefix trace segments and the valid suffix segments, and, determining a longest of the valid prefix trace segment; and
setting the longest of the valid trace segment as a starting point for a new trace for the proposed process.

14. The computer program product of claim 13, wherein for each starting point of a new trace for the proposed process is augmented by:
speculatively adding reachable nodes in the proposed process to the segment until the entry node of a valid trace suffix is reached; and
appending the reached valid trace suffix to the last speculatively added node to form a trace for the proposed process.

15. A process trace updating system, the system comprising:
a processor; and
a memory, the memory storing instructions to cause the processor to perform:
retrieving, by a computing device, a historical execution of a process that is represented as a trace of the process when changes to a decision problem has occurred that render available data of the trace as invalid;
receiving, by the computing device, a proposed incremental change, with regard to the process, for a proposed process;
updating, by the computing device, the historical execution to build a machine learning model that uses the proposed incremental change to generate a valid trace of the process by performing a trace starting at a beginning of a portion of the trace that is invalid; and
generating, by the computing device, a decision and a prediction about execution of the proposed process based upon the machine-learning model and based on a future execution of a part of the proposed process.

16. The system of claim 15, wherein the machine-learning model extends the historical execution of the process to model the proposed process by:
identifying a subset of valid traces from the historical execution of the process; and
augmenting the valid traces.

17. The system of claim 16, wherein the augmented valid traces are used as training data to improve the machine-learning model.

18. The system of claim 16, wherein the identifying identifies the subset of valid traces by:
marking all nodes and edges in the historical execution of the process that are affected by the proposed incremental change; and
filtering the valid traces in the proposed process to produce a proposed trace by eliminating all traces from the valid traces that include a node or an edge that was marked in the historical execution of the process.

19. The system of claim 15, embodied in a cloud-computing environment.

* * * * *